(12) United States Patent
Doetsch et al.

(10) Patent No.: US 6,954,484 B2
(45) Date of Patent: Oct. 11, 2005

(54) METHOD AND DEVICE FOR GENERATING A CHANNEL-CODED AND SUBSCRIBER-CODED MESSAGE SIGNAL

(75) Inventors: Markus Doetsch, Schliern (CH); Jörg Plechinger, München (DE); Michael Schneider, München (DE); Peter Jung, Otterberg (DE); Peter Schmidt, Erpolzheim (DE)

(73) Assignee: Infineon Technologies AG, Munich (DE)

( * ) Notice: Subject to any disclaimer, the term of this patent is extended or adjusted under 35 U.S.C. 154(b) by 581 days.

(21) Appl. No.: 10/047,007

(22) Filed: Jan. 16, 2002

(65) Prior Publication Data

US 2002/0122469 A1 Sep. 5, 2002

Related U.S. Application Data

(63) Continuation of application No. PCT/EP00/06751, filed on Jul. 14, 2000.

(30) Foreign Application Priority Data

Jul. 16, 1999 (DE) .......................................... 199 33 489

(51) Int. Cl.[7] ................................................ H04B 1/69
(52) U.S. Cl. ....................................... 375/146; 375/130
(58) Field of Search ................................ 375/146, 130, 375/147, 149, 140, 295, 316; 370/320, 335, 342

(56) References Cited

U.S. PATENT DOCUMENTS

| 5,321,721 A | 6/1994 | Yamaura et al. |
| 5,345,469 A | 9/1994 | Fulghum |
| 5,771,288 A | 6/1998 | Dent et al. |
| 5,790,591 A * | 8/1998 | Gold et al. ................. 375/142 |
| 5,978,412 A * | 11/1999 | Takai ......................... 375/145 |
| 6,512,753 B1 * | 1/2003 | Kim et al. .................. 370/335 |
| 6,532,563 B2 * | 3/2003 | Nobelen ..................... 714/751 |

FOREIGN PATENT DOCUMENTS

| JP | 06 204 969 | 7/1994 |
| WO | WO 98/10568 | 3/1998 |

OTHER PUBLICATIONS

Frey, T. et al.: "A First Approach to Concatenation of Coding and Spreading for CDMA–Systems", IEEE, Sep. 22, 1996, pp. 667–671.

Bickel, M. et al.: "Optimization of Code Rate and Spreading Rate and Spreading Factor for Direct–Sequence CDMA Systems", IEEE, Sep. 22, 1996, pp. 585–589.

Ye, Z. et al.: "A Rate–Adaptive Coded OFDM (RA–OFDM) Spread Spectrum System for Tactical Radio Networks", IEEE, Jun. 6, 1999, pp. 67–71.

Frenger, P. et al.: "Combined Coding and Spreading in CDMA Systems using Maximum Free Distance Convolutional Codes", IEEE, 1998, pp. 2497–2501.

* cited by examiner

Primary Examiner—Khai Tran
(74) Attorney, Agent, or Firm—Laurence A. Greenberg; Werner H. Stemer; Ralph E. Locher

(57) ABSTRACT

In a method for producing a channel-coded and subscriber-coded message signal, a coding device receives a message signal represented by a sequence of data symbols. The message signal is channel-coded using a channel code and is subscriber-coded using a specific subscriber code selected from a number of available subscriber codes. The specific subscriber code is selected from the subscriber codes available in a memory ME taking account of the error protection level of the channel-coded and subscriber-coded message signal to be transmitted, that is, such that an overall code formed from the channel code and the selected, specific subscriber code has a maximum Hamming distance.

14 Claims, 4 Drawing Sheets

METHOD AND DEVICE FOR GENERATING A CHANNEL-CODED AND SUBSCRIBER-CODED MESSAGE SIGNAL

CROSS-REFERENCE TO RELATED APPLICATION

This application is a continuation of copending International Application PCT/EP00/06751, filed Jul. 14, 2000, which designated the United States.

BACKGROUND OF THE INVENTION

Field of the Invention

The invention relates to a method and a device for generating a channel-coded and subscriber-coded message signal in a transmitter, in particular a mobile radio transmitter, which is intended for transmitting a message via a channel, in particular a radio channel.

In multisubscriber communications systems, a message to be transmitted via the channel must be prepared in the transmitter such that it is protected against interference and so that subscriber separation is possible.

The message is protected against interference by means of channel coding (which is also referred to as error protection coding). The channel coding builds redundancy into the message to be transmitted. As the redundancy increases, the interference immunity of the message transmission is improved. However, this has the disadvantage that the frequency bandwidth required for transmitting the message also increases, that is to say band spreading occurs.

The subscriber separation can likewise be achieved by coding the message. Such subscriber-specific coding is also referred to in the following text as subscriber coding. This is used to make it possible to separate message signals from a number of subscribers from one another in the respective receivers, even though these signals coexist simultaneously in the same frequency band. In comparison to other multiple access methods such as TDMA (Time Division Multiple Access), FDMA (Frequency Division Multiple Access) or SDMA (Space Division Multiple Access), the subscriber coding method has better flexibility, since the subscriber codes can be allocated and interchanged in a simple manner.

One known subscriber coding method is CDMA (Code Division Multiple Access). In CDMA, subscriber coding is generated by applying a CDMA code to each data symbol in a message signal. The CDMA subscriber coding likewise results in band spreading of the message signal, and is therefore also referred to as CDMA spread coding.

Until now, error protection coding and subscriber coding have been considered separately from one another. This applies in particular to the TD/CDMA (Time Divided Code Division Multiple Access) system, which is currently being standardized, and which is identical to the UTRA (UMTS Terrestrial Radio Access) TDD (Time Domain Duplexing) mode. UMTS is in this case an abbreviation for Universal Mobile Telecommunications Systems, and represents the third-generation mobile radio standard.

The publication "Combined Coding and Spreading in CDMA-Systems using Maximum Free Distance Convolutional Codes" by P. Frenger et al. in "Proc, of the IEEE Vehicular Technology Conference", (VTC 1998), pages 2497–2501, 1998 describes a coder which carries out both channel coding and subscriber coding. The subscriber coding is achieved in that outputs from different generators of the error protection coder are selected sequentially, and possibly more than once, by a selector. This results in the generation of a "signature sequence," which does not contribute to band spreading and is used to separate different subscriber signals during detection. In U.S. Pat. No. 5,321,721, the clock frequency of a PN spread coder is increased as soon as the transmission quality should be improved. The method of operation is based on the fact that relatively long PN sequences allow better subscriber separation. The Hamming distance of the overall code which is obtained from the channel code and the subscriber code (PN spread code) is not considered as a selection criterion.

The publication "Optimization of Code Rate and Spreading Factor for Direct-Sequence CDMA Systems", by M. Bickel et al., IEEE1996, Proceedings of the 4th International Symposium on Spread Spectrum Techniques and Applications, Vol. 2, Sep. 22–25, 1996, pages 585–89 investigates the variation of the code rate for channel coding and the spread factor of a PN spread code assuming a fixed processing gain (the overall bandwidth expansion obtained by channel coding and PN coding). The required PN code (or, to be more precise, its spread factor) is in this case obtained directly from the code rate on the basis of the necessary condition (fixed overall bandwidth expansion).

The article "A Rate-Adaptive Coded OFDM (RA-OFDM) Spread Spectrum System for Tactical Radio Networks" by Z. Ye et al., Communication Theory Mini-Conference 1999, Jun. 6–10, 1999, pages 67–71 likewise considers the trade-off between the code rate of a channel code and the spread factor of a subscriber code for a given overall bandwidth expansion. The subscriber coding is achieved either by means of an OFDM-SS code (spread) or by means of an OFDM code (not spread).

The document "A First Approach to Concatenation of Coding and Spreading for CDMA-Systems", by T. Frey et al., 1996 IEEE 4th International Symposium on Spread Spectrum Techniques and Applications Proceedings, Vol. 2, Sep. 22–25, 1996, pages 667–671 uses a channel code C(n, k, d) and a PN subscriber code to code an information sequence. The signal spreading is carried out just by the channel code, which is the same for all subscribers, and the PN subscriber coding does not contribute to the band spreading. The selection of specific PN subscriber codes is not considered.

SUMMARY OF THE INVENTION

It is accordingly an object of the invention to provide a method for generating a channel-coded and subscriber-coded message signal, which overcomes the above-mentioned disadvantages of the heretofore-known devices and methods of this general type and which allows error protection that is as good as possible for the message to be transmitted. It is a further object of the invention to provide a device for producing such a channel-coded and subscriber-coded message signal for a transmitter, in particular a mobile radio transmitter.

With the foregoing and other objects in view there is provided, in accordance with the invention, a method for generating a channel-coded and subscriber-coded message signal in a transmitter, such as a mobile radio transmitter, the transmitter having a coding device for receiving a message signal represented by a sequence of data symbols, for channel-coding the received message signal using a channel code, and for subscriber-coding the message signal with a specific subscriber code selected from a plurality of available subscriber codes, and for emitting a channel-coded and subscriber-coded message signal to be transmitted. The method comprises selecting the subscriber code such that an overall code formed from the channel code and the selected, specific subscriber code has a maximum Hamming distance.

According to the invention, the subscriber code to be used for transmission is no longer selected just from the viewpoint of multiple access handling that is as flexible and simple and possible, but also from the viewpoint of error protection of the message signal to be transmitted. The conventional separation between the channel coding (for the purpose of error protection) and the subscriber coding (for the purpose of subscriber separation) is thus nullified. This means that an overall code which allows subscriber separation and has good error protection characteristics and little band spreading can be provided. In this case, the specific subscriber code is selected from the available subscriber codes such that the overall code formed from the channel code and the selected subscriber code has a maximum Hamming distance. The Hamming distance is the minimum distance between two (random) code words. The greater the Hamming distance, the more reliably and hence error-tolerantly the decoding of the overall code can be carried out in the receiver.

In accordance with an added feature of the invention, the channel coder is enabled to generate channel codes at a variable code rate R, and the method comprises selecting the specific subscriber code and the code rate R for the channel code that is used such that the Hamming distance of the overall code formed from the channel code and subscriber code is a maximum.

In accordance with an additional feature of the invention, the channel coder is enabled to generate different code types (such as block codes, convolution codes, parallel and serial concatenated convolution codes, and/or block codes and turbo codes). Here, the specific subscriber code and the type code of the channel code that is used is selected such that the Hamming distance of the overall code formed from the channel code and the subscriber code is a maximum.

In other words, the specific subscriber code can be selected as a function of the channel code that is used. If the channel coder generates channel codes at a variable rate R, the code rate R can be used as a selection parameter. It is also possible to use a channel coder which can generate different code types, in particular block codes, convolution codes, parallel or serial concatenated convolution and/or block codes and, in particular, turbo codes. In this case, the subscriber code selection can be based on the type of channel code used.

In accordance with another feature of the invention, the specific subscriber code is selected as a function of the service to be transmitted.

By way of example, DS (Direct Sequencing) CDMA spread coding, MC (Multi Carrier) CDMA spread coding or else FH (Frequency Hopping) CDMA spread coding can be used for the subscriber coding.

With the above and other objects in view there is also provided, in accordance with the invention, a device for generating a channel-coded and subscriber-coded message signal in a transmitter, comprising:

a coding device configured to receive a sequence of data symbols representing a message signal and to emit a channel-coded and subscriber-coded message signal to be transmitted;

the coding device having a channel coder for channel-coding the message signal using a channel code; and a subscriber coder for subscriber-coding the message signal using a specific subscriber code selected from a number of available subscriber codes;

wherein the specific subscriber code is selected from the available subscriber codes such that a resulting overall code formed from the channel code and the selected subscriber code has a maximum Hamming distance.

In accordance with a concomitant feature of the invention, the channel coder is configured to generate a channel code with a variable code selected from the group consisting of a variable code rate and a variable code type; and the specific subscriber code and the variable code (code rate and/or code type) are selected to result in the overall code formed from the channel code and the selected subscriber code to have a maximum Hamming distance.

Other features which are considered as characteristic for the invention are set forth in the appended claims.

Although the invention is illustrated and described herein as embodied in a method and device for generating a channel-coded and subscriber-coded message signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
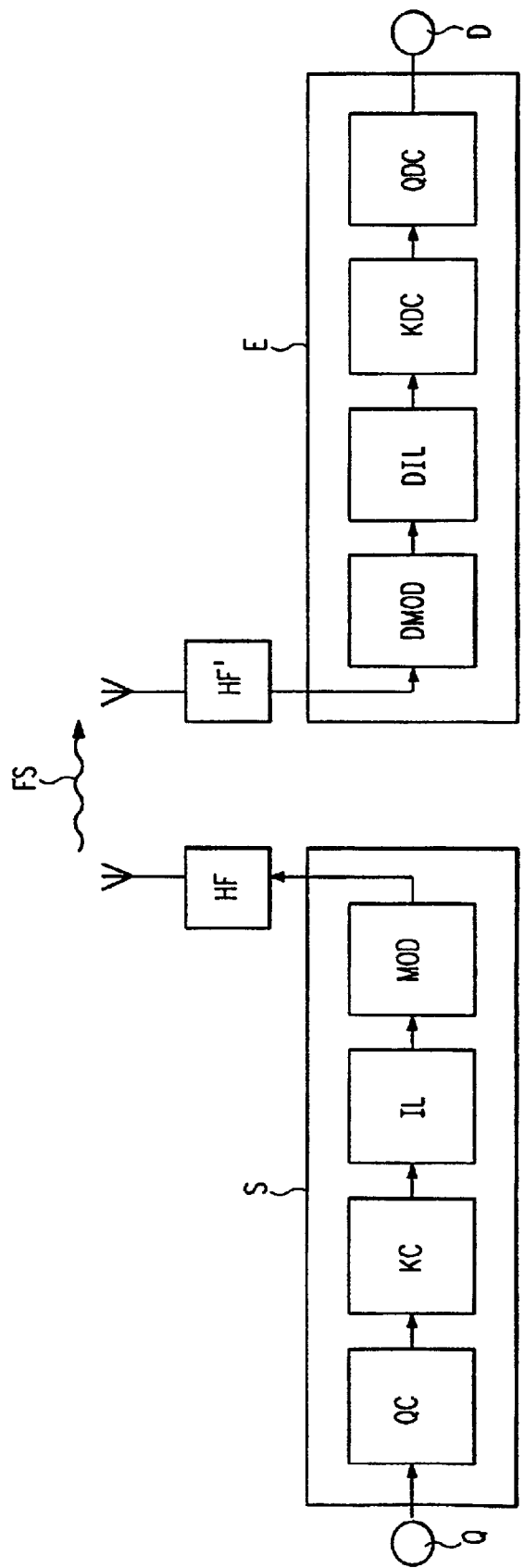
FIG. 1 is a schematic block diagram of the air interface of a mobile radio system with a transmitter and a receiver.

Referring now to the figures of the drawing in detail and first, particularly, to FIG. 1 thereof, there is shown a transmitter S and a receiver E in a mobile radio system. Both the transmitter S and the receiver E can be used either as a base station or as a mobile station in, in particular, in a cellular mobile radio system.

A message source Q, for example a microphone, camera, etc., generates a message to be transmitted. The message to be transmitted may be either in the form of an analog signal (for example voice, music, video signal) or else in the form of a digital signal (for example the memory contents of a digital voice, music, video memory). The message is then supplied to a source coder QC, with the message signal having previously been converted from analog to digital form in the former case (analog message signal). The source coder QC converts the received digital message signal to a digital signal with less redundancy. It thus produces information compression or data compression, which allows the subsequent data processing and transmission to be carried out, in principle, at a lower data rate.

If packet-switching data transmission is envisaged, the source coder QC furthermore subdivides the message data into individual data packets.

A channel coder KC receives the source-coded message data and carries out channel coding, matched to the transmission channel, in a manner which will be described in more detail later.

An optional interleaver IL downstream from the channel coder KC is likewise intended to improve the error protection for the received message. The transmitter-end interleaving of the channel-coded message signal to be transmitted increases the statistical independence of detection errors that occur during decoding in the receiver.

The interleaver IL is followed by a modulator MOD which contains, in a manner which is not illustrated in any more detail, a block former, a spread coder and the actual modulator stage. A baseband signal emitted from the modulator MOD is modulated in a radio-frequency stage HF onto a radio-frequency carrier, and is transmitted as a radio signal FS by means of an antenna.

The radio signal FS is transmitted via the air interface, and is received by the receiver E. At the same time, the receiver E also receives radio signals which have been sent by other transmitters in the multisubscriber communications system.

The received message signals are converted to baseband in a radio-frequency stage HF'. The baseband signal emitted from the radio-frequency stage HF' is supplied to a demodulator DMOD. The demodulator DMOD has, in a manner which is not illustrated in any more detail, an analogue-to-digital converter, a spread decoder and an adaptive, coherent data detector.

The spread code (subscriber code) used by the transmitter S under consideration here is known to the spread decoder, which is informed of any change between this and the current spread code. The spread decoder correlates the baseband signal (which contains all the received message signals) with the spread code used at the transmitter end in order to separate the subscribers, that is to say it recovers the signal component originating from the transmitter S from the baseband signal.

The adaptive coherent data detector then carries out a detection process, matched to the instantaneous state of the transmission channel (air interface) on the transmitted message signal originating from the transmitter S, taking account of the magnitude and the phase of the reception field strength of this message signal. At its output, the demodulator DMOD produces a data symbol sequence which is a reconstruction of the data symbol sequence received from the modulator MOD in the transmitter S.

Multisubscriber detection can also be provided, in which the data detector detects a number of subscriber signals, as a result of which it is possible to eliminate (deterministic) interference components caused by other subscriber signals in the subscriber signal of interest.

The data symbol sequence emitted from the demodulator DMOD is changed back to the correct sequence by an (optional) deinterleaver DIL (that is to say the data symbol interleaving produced by the interleaver IL is reversed), and this is supplied to a channel decoder KDC. The channel decoder KDC decodes the detected, coded data symbols on the basis of the channel code used in the channel coder KC. In order to do this, the channel decoder KDC moves the channel code used in the transmitter S, and is told of any changes to the current channel code from this.

In order to assist the work of the channel decoder KDC and to increase the number of correctable detection errors, the adaptive coherent data detector can generate reliability information for each detected data symbol, and can signal this to the channel decoder KDC (so-called "soft decision").

The channel decoder KDC generates a data symbol sequence whose data symbols are reconstructions of the data symbols which are received from the channel coder KC in the transmitter S.

A data symbol is reconstructed either correctly or wrongly. The bit error rate indicates the relative frequency of incorrectly reconstructed data symbols.

The data symbols decoded by the channel decoder KDC are source-decoded in a source decoder QDC, are converted to an analog data signal if required, and are supplied to a suitable message sink D (loudspeaker, display, etc).

Figure 2:
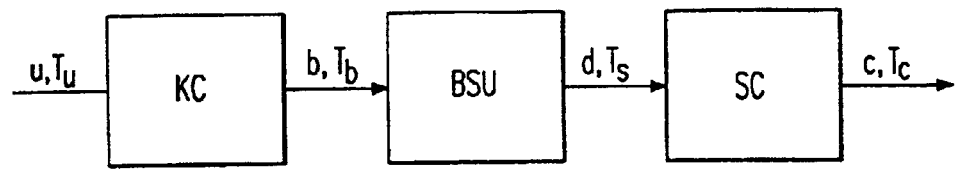
FIG. 2 is a block diagram illustrating the band spreading during channel-coding and subscriber-coding.

Reference will now be had to FIG. 2 in explaining the band spreading, generated by the channel coding and spread coding in the transmitter S, of the message signal to be transmitted. The source-coded digital message signal supplied to the channel coder KC comprises a sequence of bits u. The duration of one bit u is TU. The channel coder KC adds redundancy to the sequence of bits u, and emits a sequence of bits b with a bit duration $T_b$. The code rate R of the channel coder KC is defined in the normal way as the ratio k/n, where n is the number of bits b which are produced at the output of the channel coder KC in response to k bits u entered in the channel coder KC (by the addition of r redundant bits), that is to say n=k+r. In consequence: $R=T_b/T_u$. The code rate R is typically between 1/3 and 1. The bandwidth of the message signal is increased, that is to say "spread" from $1/T_u$ to $1/T_b$ in the channel coder KC.

The bits b contained in the output signal of the channel coder KC are then mapped onto multivalent data symbols d in an (optional) bit-to-symbol converter BSU. Each data symbol d has a symbol duration of $T_s$, where $T_s \geq T_b$.

Finally, the data symbols d are spread-modulated in the spread coder SC in the modulator MOD. In the case of DS-CDMA, each data symbol is multiplied by an individual CDMA spread code (subscriber code) of length L. The chips c generated in the process have a chip duration $T_c$.

Figure 4:
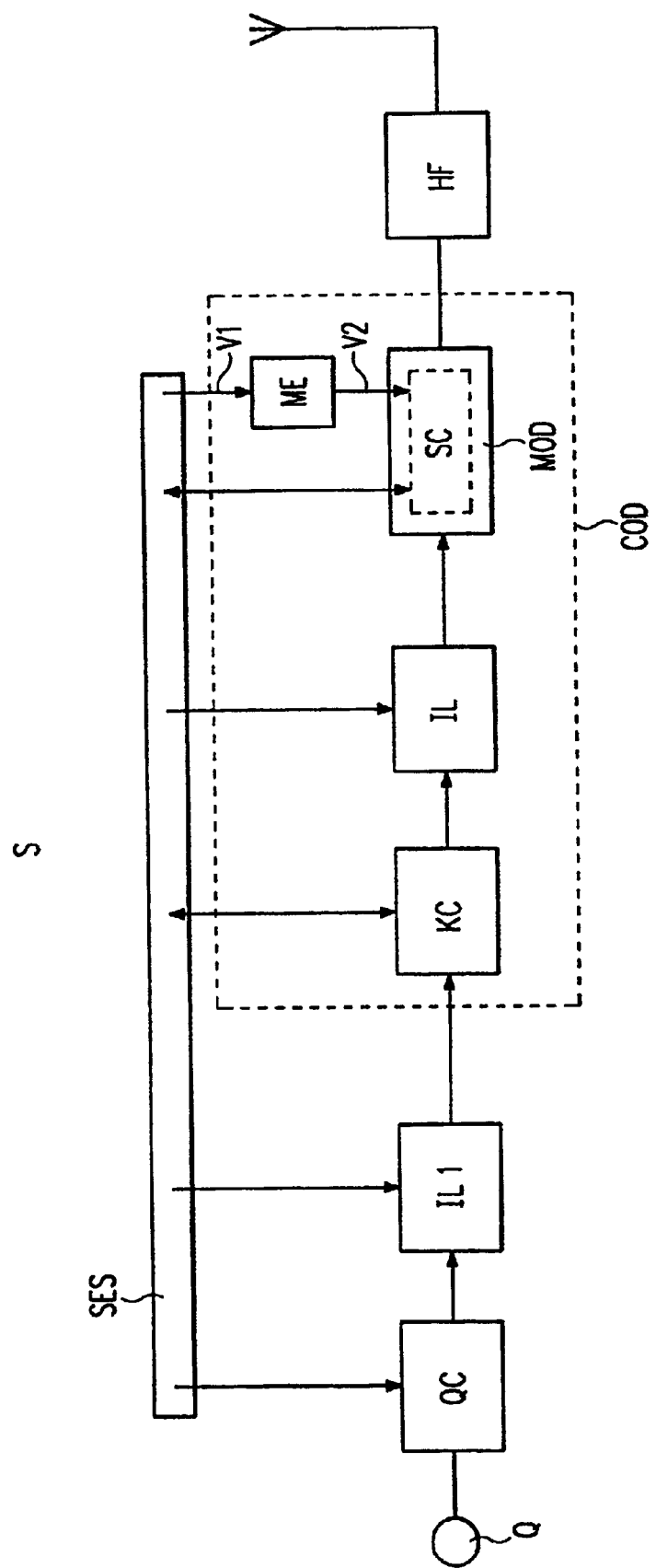
FIG. 4 is a block diagram of a transmitter with a coding device based on one exemplary embodiment of the present invention.

The combination of the channel coder KC and spread coder SC illustrated in FIG. 2 can be combined both figuratively and physically to form an (overall) coding device COD (see also FIG. 4). For the sake of simplicity, the following text assumes the bit-to-symbol converter BSU is not present, that is to say b=d and $T_b=T_s$. The code rate $R_c$ of the coding device COD according to the invention is then given by $R_c=T_c/T_u=k/nL$. The code rate $R_c$ of the coding device COD is thus influenced not only by the code rate R of the channel coder KC but also by the length L of the CDMA spread code used.

Figure 3:
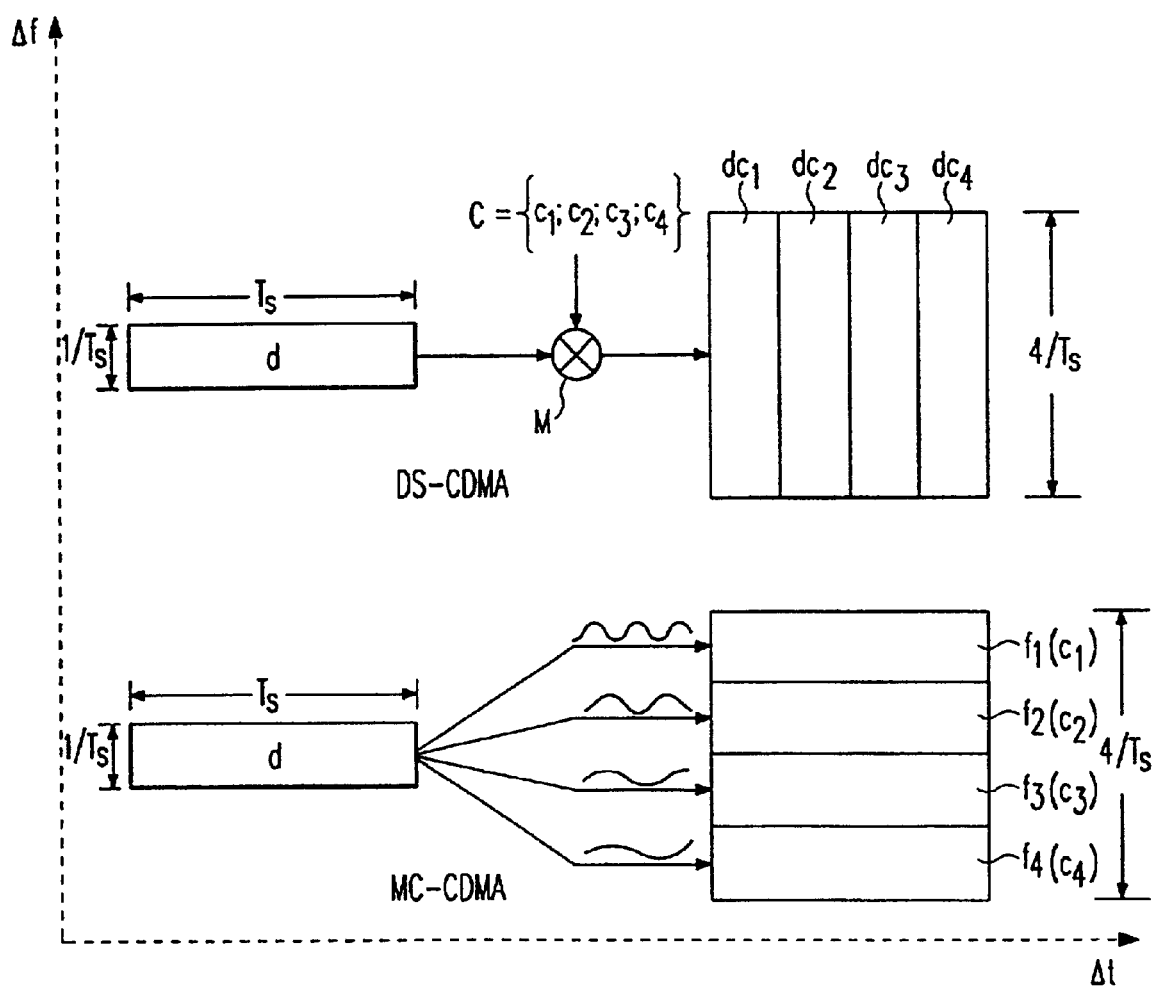
FIG. 3 is a graphical illustration of band spreading for DS-CDMA and MC-CDMA.

FIG. 3 shows two specific forms of CDMA spread coding, namely DS-CDMA (upper illustration in FIG. 3) and MC-CDMA (lower illustration in FIG. 3). The vertical axis in this case represents the band spreading $\Delta f$ in the frequency domain, and the horizontal axis represents the time duration $\Delta t$.

In the case of DS-CDMA, a data symbol d is multiplied in a multiplier M by a subscriber-specific CDMA spread code C comprising, for example, L=4 code elements $c_1, c_2, c_3, c_4$, each having a chip duration $T_c$. The resultant spread-coded (i.e., subscriber-coded) data sequence comprises four chips $dc_1, dc_2, dc_3, dc_4$, and has a frequency bandwidth of $4/T_s$.

In the case of MC-CDMA the data symbol d is transmitted using the above-mentioned CDMA spread code C on four narrowband, disjunct frequency bands $f_1$, $f_2$, $f_3$ and $f_4$ associated with respective individual code elements $c_1$, $c_2$, $c_3$, $c_4$. The frequency bands $f_1$, $f_2$, $f_3$ and $f_4$ can be distributed discontinuously in the frequency domain. The resultant band spreading is once again $4/T_s$, that is to say in general, $L/T_s$ based on a CDMA spread code of length L.

FIG. 4 shows the transmitter S illustrated in FIG. 1, in greater detail. The source coder QC, the channel coder KC, the interleaver IL and the spread coder SC contained in the modulator MOD are controlled by a central control unit SES in the transmitter S. The control unit SES is also connected to a further interleaver IL1, which is arranged in the signal path between the source coder QC and the coding device COD. Various CDMA spread codes are stored in a memory ME, for example a ROM. A specific CDMA spread code can be selected via a link V1 to the control unit SES, and can be down-loaded via a data link V2 to the modulator MOD for subscriber-specific spread coding of the message signal. Various influencing variables can be taken into account when selecting the specific spread code.

First of all, it is necessary to ensure that a CDMA spread code which is still "free" is used and which is not currently selected by any other subscriber communicating in the same physical region. To do this, the receiver E (for example a base station) can, if required, signal a "proposal list" of all currently free CDMA spread codes to the transmitter S. Other aspects relating to the handling of multiple access can also be signaled to the transmitter S, and can be taken into account during the subsequent code allocation.

According to the invention, the error protection level of the coded message signal emitted from the coding device COD is also taken into account when selecting the specific CDMA spread code. This is based on the fact that a combination of a channel code that is optimized for channel transmission with a spread code that is optimized for subscriber separation does not necessarily result in an "overall code" with optimum error protection characteristics (that is to say, for example, an optimum bit error ratio in the receiver E). The invention allows the overall code generated by the channel coding and spread coding to be optimized by deliberate selection of the CDMA spread code so as to achieve better reception in the receiver E.

The selection of a suitable CDMA spread code by the central control unit SES can be carried out, for example, as follows:

Provided different channel codes can be generated in the channel coder KC, as will be explained in more detail in the following text, each code pair (channel code, CDMA spread code) can be allocated a weighting figure which indicates the error protection level of the overall code generated by that code pair. (The respective weighting figures can be determined in advance by simulation calculations, and can be entered in the control unit SES by the manufacturer). When setting up a communications link, it is then possible to select that code pair (channel code, CDMA spread code) which has the highest weighting figure, ignoring those code pairs which cannot be used owing to multiple access restrictions.

If the channel code is permanently preset, an analogous procedure may be used. The (possible) CDMA spread code is then simply selected whose weighting figure is a maximum—calculated with respect to the preset channel code.

Instead of a weighting figure obtained by simulation calculation, the selection of the specific CDMA spread code or code pair can also be based on the Hamming distance of the overall code, that is to say a CDMA spread code can be selected which generates an overall code with the maximum Hamming distance.

Finally, the CDMA spread code or code pair (channel code, CDMA spread code) should be selected either so as to achieve the least possible amount of band spreading or to comply with a predetermined, maximum permissible band spread.

After selection of the specific CDMA spread code or a code pair (channel code, CDMA spread code), the selected CDMA spread code or the selected code pair must still be signaled to the receiver E in order to allow the coded transmitted message signal to be decoded in the receiver E.

It is also possible to take account of an acknowledgement signal, transmitted by the receiver E, as an influencing variable when selecting the CDMA spread code or code pair. In the receiver E, the error protection level achieved by the coding can be determined directly from the resultant transmission quality. By way of example, the incorrect transmission of a received data block or data packet can be detected by means of a simple parity check in the receiver E, or the bit error rate can be estimated by calculating the variance of the reliability information associated with the received data symbols. An acknowledgement signal which contains information about the estimated bit error rate and/or error state information can then be taken into account in the transmitter S in the selection of the specific CDMA spread code or code pair. If critical transmission conditions occur in the course of a communication process, it is possible to improve, or at least maintain, the communication link by changing the CDMA spread code or the code pair.

It is also possible for the specific CDMA spread code or the code pair to be selected in the receiver, and to be signaled to the transmitter S in the form of a code allocation instruction.

The following influencing variables can also be taken into account, among others, when selecting the specific CDMA spread code or code pair:

the source code of the source coder QC, provided variable source coding is provided, the interleaving depth and interleaving type (block interleaving, convolution interleaving), provided an interleaver IL1 or IL with a variable interleaving depth/interleaving type is provided, in the case of channel code (already mentioned), in particular the code rate R and the code type, provided a channel coder KC at a variable code rate and/or using a variable code type is provided, the present service, provided—as normal—a large number of services are being offered (for example the maximum permissible bit error rate for voice services is approximately $10^{-3}$ and for data services $10^{-6}$).

Figure 5:
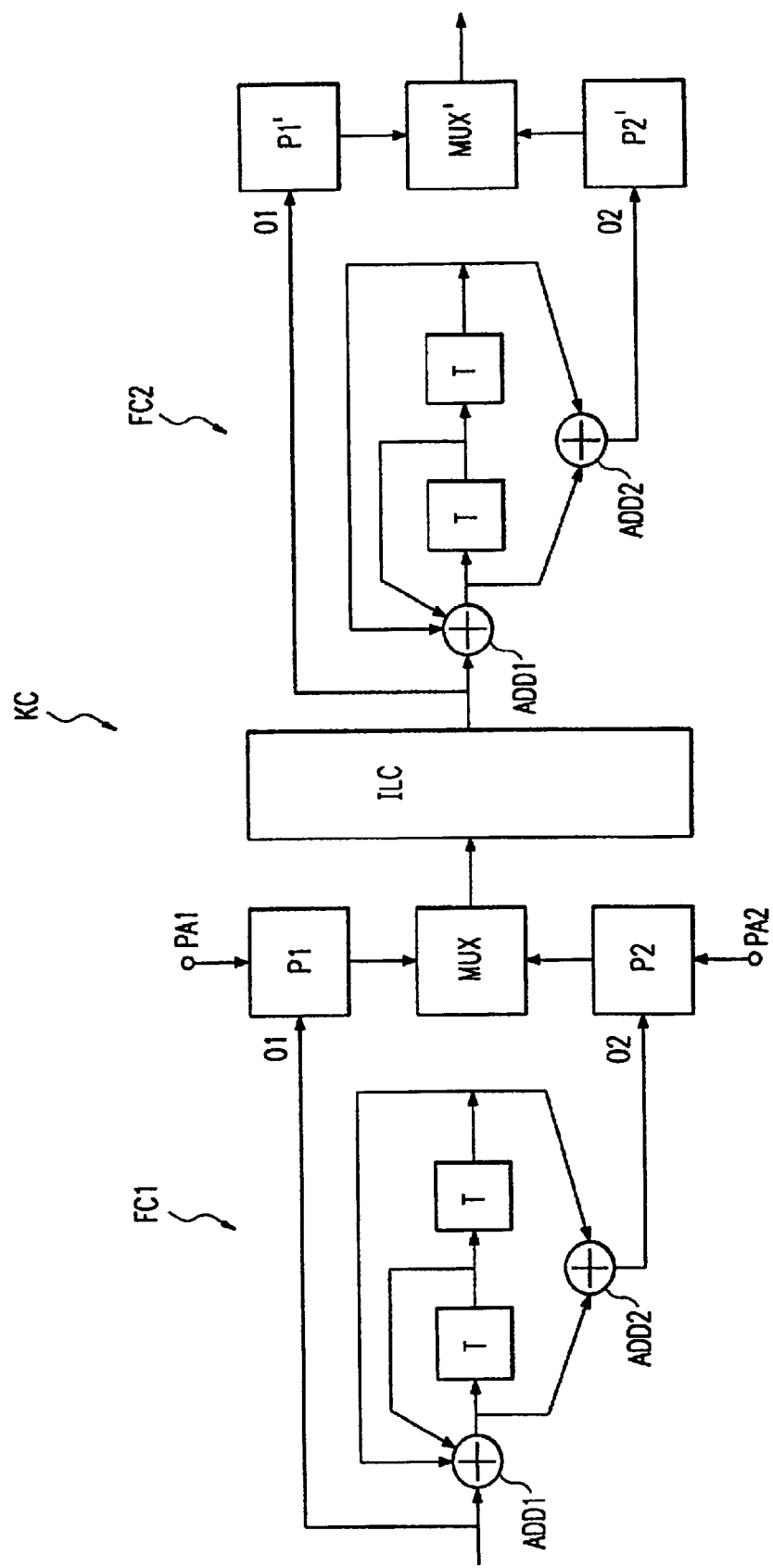
FIG. 5 is a block diagram of a channel coder with a variable code rate.

FIG. 5 shows one specific example of a channel coder KC which can be used for the purposes of the invention and has a variable code rate R.

The channel coder KC comprises a first recursive systematic convolution coder FC1, a code rate increasing stage, which is formed from two puncturers P1, P2 and a multiplexer MUX, an interleaver ILC following the code rate increasing stage P1/P2/MUX, a second recursive systematic convolution coder FC2 and a further code rate increasing stage P1'/P2'/MUX', which may be designed to be physically identical to the first code rate increasing stage P1/P2/MUX.

Each convolution coder FC1, FC2 has, on the input side, a first adder ADD1 and a shift register, following the first adder ADD1, with two memory cells T. The convolution coders FC1, FC2 each have a first output O1 at which a binary sequence is emitted whose elements (bits) are identical to the originally received data bits u. Coders with this characteristic are referred to as systematic coders. The convolution coder FC1 or FC2 produces a redundant binary data sequence, which is formed by a second adder ADD2, at a second output O2. As can clearly be seen, a redundant bit which is present at a specific time at the second output O2 is dependent on the input bit u and on the previous bits u stored in the two memory cells T. The convolution coders FC1, FC2 thus have a reversion depth of 3.

Since one, and only one redundant bit is generated for each input bit u, the code rate of the first convolution coder FC1 as well as the code rate of the second convolution coder FC2 are both 0.5.

The puncturer P1 receives the systematic bit sequence (input bits u) produced at the output O1. The redundant bit sequence produced at the output O2 of the first convolution coder FC1 is supplied to the second puncturer P2. Both puncturers P1, P2 have one control input, which is connected to the control unit SES for the transmitter S, as illustrated in FIG. 4. A puncturing instruction PA1 or PA2, respectively, which is emitted by the control unit SES, is signaled via this control unit to the respective puncturer P1 or P2. The puncturing instruction PA1 or PA2, respectively, indicates a puncturing pattern in accordance with which the systematic bit sequence or redundant bit sequence passing through the respective puncturer is to be punctured.

For example, the puncturing pattern may be "xx0xx0xx0xx0 . . . ". in this case, x indicates "puncture" and 0 indicates "do not puncture". A puncturing instruction PA1 or PA2 such as this accordingly always punctures two data symbols, that is to say eliminates them from the bit sequence, and passes on one.

The bits which are passed on by the puncturers P1, P2 and are multiplexed in the multiplexer MUX are supplied to the second convolution coder FC2 after block-by-block or convolutional interleaving in the interleaver ILC, as already described, where they are processed further in the same way as in the first convolution coder FC1. The channel-coded message signal is produced at the output of the second multiplexer MUX'.

The minimum achievable code rate R with the channel coder KC is 1/4. The code rate R of the channel coder KC can be varied as required by actuation of the puncturers P1 and P2 (and possibly also P1' and P2' in a manner which is not illustrated). Another option for designing the channel code generated in the channel coder KC to be variable is to vary the code type of the coder. The channel coder illustrated in FIG. 5 generates a serial concatenated convolution code. If block coders are used instead of the convolution coders FC1, FC2, a serial concatenated block code is generated. Parallel concatenated codes (convolution codes, block codes or combinations of such codes) can be generated in an analogous manner. A modular design of a channel coder with corresponding switching options makes it possible to provide a large number of different code types, which can then be set as required, likewise by the control unit SES.

In summary, it can be stated that, according to the invention, the additional degree of freedom provided by the capability to select a subscriber code is utilized in order to improve the error protection.

We claim:

1. In a method for generating a channel-coded and subscriber-coded message signal in a transmitter, the transmitter having a coding device for receiving a message signal represented by a sequence of data symbols, for channel-coding the received message signal using a channel code, and for subscriber-coding the message signal with a specific subscriber code selected from a plurality of available subscriber codes, and for emitting a channel-coded and subscriber-coded message signal to be transmitted, the method which comprises selecting the subscriber code such that an overall code formed from the channel code and the selected, specific subscriber code has a maximum Hamming distance.

2. The method according to claim 1, which comprises generating message signals for a mobile radio transmitter.

3. The method according to claim 1, wherein a channel coder is enabled to generate channel codes at a variable code rate R, and the method comprises selecting the specific subscriber code and the code rate R for the channel code that is used such that the Hamming distance of the overall code formed from the channel code and subscriber code is a maximum.

4. The method according to claim 1, wherein the channel coder is enabled to generate different code types, and the method comprises selecting the specific subscriber code and the type code of the channel code that is used such that the Hamming distance of the overall code formed from the channel code and the subscriber code is a maximum.

5. The method according to claim 4, wherein the channel coder is enabled to generate at least one of the code types selected from the group consisting of block codes, convolution codes, parallel concatenated convolution codes, serial concatenated convolution codes, and block codes and turbo codes.

6. The method according to claim 1, which comprises selecting the specific subscriber code as a function of the service to be transmitted.

7. The method according to claim 1, which comprises using a DS-CDMA spread coding as the subscriber coding.

8. The method according to claim 1, which comprises using a MC-CDMA spread coding as the subscriber coding.

9. In a transmitter, a method of generating a channel-coded and subscriber-coded message signal, which comprises:

receiving, with a coding device of the transmitter, a sequence of data symbols representing a message signal;

channel-coding the message signal using a channel code and subscriber-coding the message signal with a specific subscriber code and thereby selecting the subscriber code from a plurality of available subscriber codes such that an overall code formed from the channel code and the selected subscriber code has a maximum Hamming distance; and emitting a channel-coded and subscriber-coded message signal to be transmitted by the transmitter.

10. A device for generating a channel-coded and subscriber-coded message signal in a transmitter, comprising:

a coding device configured to receive a sequence of data symbols representing a message signal and to emit a channel-coded and subscriber-coded message signal to be transmitted;

said coding device having
a channel coder for channel-coding the message signal using a channel code; and
a subscriber coder for subscriber-coding the message signal using a specific subscriber code selected from a number of available subscriber codes;

wherein the specific subscriber code is selected from the available subscriber codes such that a resulting overall code formed from the channel code and the selected subscriber code has a maximum Hamming distance.

11. The device according to claim 10, wherein said coding device is incorporated in a mobile radio transmitter.

12. The device according to claim 10, wherein said channel coder is configured to generate a channel code with a variable code selected from the group consisting of a variable code rate and a variable code type; and the specific subscriber code and the variable code are selected to result in the overall code formed from the channel code and the selected subscriber code to have a maximum Hamming distance.

13. The device according to claim 10, wherein the subscriber code is a DS-CDMA spread code.

14. The device according to claim 10, wherein the subscriber code is an MC-CDMA spread code.

* * * * *